United States Patent
Nguyen et al.

(10) Patent No.: US 12,414,051 B2
(45) Date of Patent: Sep. 9, 2025

(54) POWER CONTROL FOR SOUNDING REFERENCE SIGNAL RESOURCE INDICATOR BASED ANTENNA SELECTION

(71) Applicant: QUALCOMM Incorporated, San Diego, CA (US)

(72) Inventors: Danh Huu Hoang Nguyen, Stow, MA (US); Enoch Shiao-Kuang Lu, San Diego, CA (US); Pranay Sudeep Rungta, New York, NY (US); Sanghoon Kim, San Jose, CA (US); Dinesh Kumar Devineni, San Diego, CA (US); Aamod Khandekar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/060,805

(22) Filed: Dec. 1, 2022

(65) Prior Publication Data
US 2023/0180142 A1    Jun. 8, 2023

Related U.S. Application Data

(60) Provisional application No. 63/264,813, filed on Dec. 2, 2021.

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0048* (2013.01); *H04W 52/325* (2013.01); *H04W 72/23* (2023.01)

(58) Field of Classification Search
CPC . H04W 52/242; H04W 52/325; H04W 72/23; H04W 72/232; H04W 52/146; H04W 52/42; H04L 5/0048
See application file for complete search history.

(56) References Cited

U.S. PATENT DOCUMENTS

2019/0159136 A1*  5/2019  MolavianJazi ..... H04W 52/362
2020/0389267 A1* 12/2020  Chen .................... H04W 52/146
(Continued)

OTHER PUBLICATIONS

Chen, Bingcai, et al. "A novel spectrum sharing scheme assisted by secondary NOMA relay." IEEE Wireless Communications Letters 7.5 (2018): 732-735. (Year: 2018).*

(Continued)

*Primary Examiner* — Sharad Rampuria
(74) *Attorney, Agent, or Firm* — Harrity & Harrity, LLP\Qualcomm

(57) ABSTRACT

Various aspects of the present disclosure generally relate to wireless communication. In some aspects, a user equipment (UE) may receive a configuration for a sounding reference signal (SRS) resource set that includes a first SRS resource associated with a first SRS resource indicator (SRI) and a first antenna of the UE, and a second SRS resource associated with a second SRI and a second antenna of the UE. The UE may receive first downlink control information (DCI) that schedules a first uplink communication on a first uplink channel, wherein the first DCI indicates the first SRI. The UE may transmit, using the first antenna, the first uplink communication using a transmit power that is based at least in part on a weighted average of a first pathloss associated with the first antenna and a second pathloss associated with the second antenna. Numerous other aspects are described.

30 Claims, 10 Drawing Sheets

(51) Int. Cl.
  *H04W 52/32* (2009.01)
  *H04W 72/23* (2023.01)

(56) References Cited

U.S. PATENT DOCUMENTS

| | | | | |
|---|---|---|---|---|
| 2020/0389885 | A1* | 12/2020 | Tomeba | H04W 72/21 |
| 2022/0225362 | A1* | 7/2022 | Yi | H04L 1/1864 |
| 2022/0353707 | A1* | 11/2022 | Cirik | H04L 5/0048 |
| 2023/0189254 | A1* | 6/2023 | Go | H04B 7/06 370/329 |
| 2025/0056551 | A1* | 2/2025 | Cirik | H04L 5/0051 |

OTHER PUBLICATIONS

Reddy, A. Phani Kumar, et al. "5G new radio key performance indicators evaluation for IMT-2020 radio interface technology." IEEE Access 9 (2021): 112290-112311. (Year: 2021).*

"3rd Generation Partnership Project, Technical Specification Group Radio Access Network, NR, User Equipment (UE) Radio Transmission and Reception, Part 1: Range 1 Standalone (Release 17)", 3GPP Standard Technical Specification, 3GPP TS 38.101-1, 3rd Generation Partnership Project, Mobile Competence Centre, 650, Route Des Lucioles, F-06921 Sophia-Antipolis Cedex, France, vol. RAN WG4, No. V17.3.0, Oct. 6, 2021, XP052057127, pp. 1-580, section 6.3.3.6 section 6.3.3.7.

International Search Report and Written Opinion—PCT/US2022/080791—ISA/EPO—Apr. 5, 2023.

* cited by examiner

POWER CONTROL FOR SOUNDING REFERENCE SIGNAL RESOURCE INDICATOR BASED ANTENNA SELECTION

CROSS-REFERENCE TO RELATED APPLICATION

This Patent Applications claims priority to U.S. Provisional Patent Application No. 63/264,813, filed on Dec. 2, 2021, entitled "POWER CONTROL FOR SOUNDING REFERENCE SIGNAL RESOURCE INDICATOR BASED ANTENNA SELECTION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for power control for sounding reference signal (SRS) resource indicator (SRI) based antenna selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a configuration for a sounding reference signal (SRS) resource set that includes a first SRS resource associated with a first SRS resource indicator (SRI) and a first antenna of the UE, and a second SRS resource associated with a second SRI and a second antenna of the UE. The one or more processors may be configured to receive first downlink control information (DCI) that schedules a first uplink communication on a first uplink channel, wherein the first DCI indicates the first SRI. The one or more processors may be configured to transmit, using the first antenna, the first uplink communication using a transmit power that is based at least in part on a weighted average of a first pathloss associated with the first antenna and a second pathloss associated with the second antenna.

Some aspects described herein relate to a method of wireless communication performed by a UE. The method may include receiving a configuration for an SRS resource set that includes a first SRS resource associated with a first SRI and a first antenna of the UE, and a second SRS resource associated with a second SRI and a second antenna of the UE. The method may include receiving first DCI that schedules a first uplink communication on a first uplink channel, wherein the first DCI indicates the first SRI. The method may include transmitting, using the first antenna, the first uplink communication using a transmit power that is based at least in part on a weighted average of a first pathloss associated with the first antenna and a second pathloss associated with the second antenna.

Some aspects described herein relate to a non-transitory computer-readable medium that stores a set of instructions for wireless communication by a UE. The set of instructions, when executed by one or more processors of the UE, may cause the UE to receive a configuration for an SRS resource set that includes a first SRS resource associated with a first SRI and a first antenna of the UE, and a second SRS resource associated with a second SRI and a second antenna of the UE. The set of instructions, when executed by one or more processors of the UE, may cause the UE to receive first DCI that schedules a first uplink communication on a first uplink channel, wherein the first DCI indicates the first SRI. The set of instructions, when executed by one or more processors of the UE, may cause the UE to transmit, using the first antenna, the first uplink communication using a transmit power that is based at least in part on a weighted average of a first pathloss associated with the first antenna and a second pathloss associated with the second antenna.

Some aspects described herein relate to an apparatus for wireless communication. The apparatus may include means for receiving a configuration for an SRS resource set that includes a first SRS resource associated with a first SRI and a first antenna of the apparatus, and a second SRS resource associated with a second SRI and a second antenna of the apparatus. The apparatus may include means for receiving first DCI that schedules a first uplink communication on a first uplink channel, wherein the first DCI indicates the first SRI. The apparatus may include means for transmitting, using the first antenna, the first uplink communication using a transmit power that is based at least in part on a weighted average of a first pathloss associated with the first antenna and a second pathloss associated with the second antenna.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
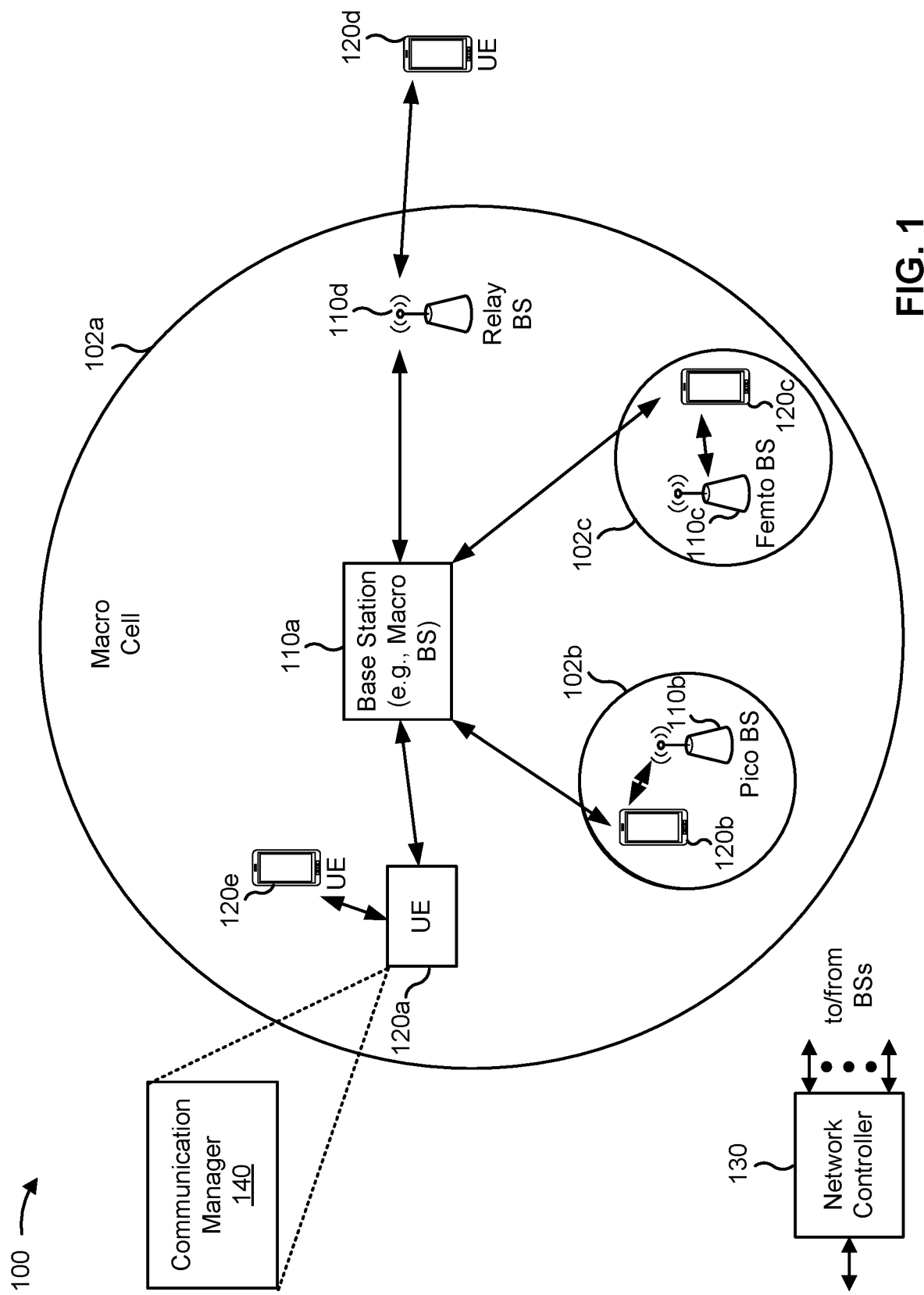
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any quantity of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for a sounding reference signal (SRS) resource set that includes a first SRS resource associated with a first SRS resource indicator (SRI) and a first antenna of the UE, and a second SRS resource associated with a second SRI and a second antenna of the UE; receive first downlink control information (DCI) that schedules a first uplink communication on a first uplink channel, wherein the first DCI indicates the first SRI; and transmit, using the first antenna, the first uplink communication using a transmit power that is based at least in part on a weighted average of a first pathloss associated with the first antenna and a second pathloss associated with the second antenna. Additionally, or alternatively, the communication manager 140 may perform one or more other operations described herein.

As indicated above, FIG. 1 is provided as an example. Other examples may differ from what is described with regard to FIG. 1.

Figure 2:
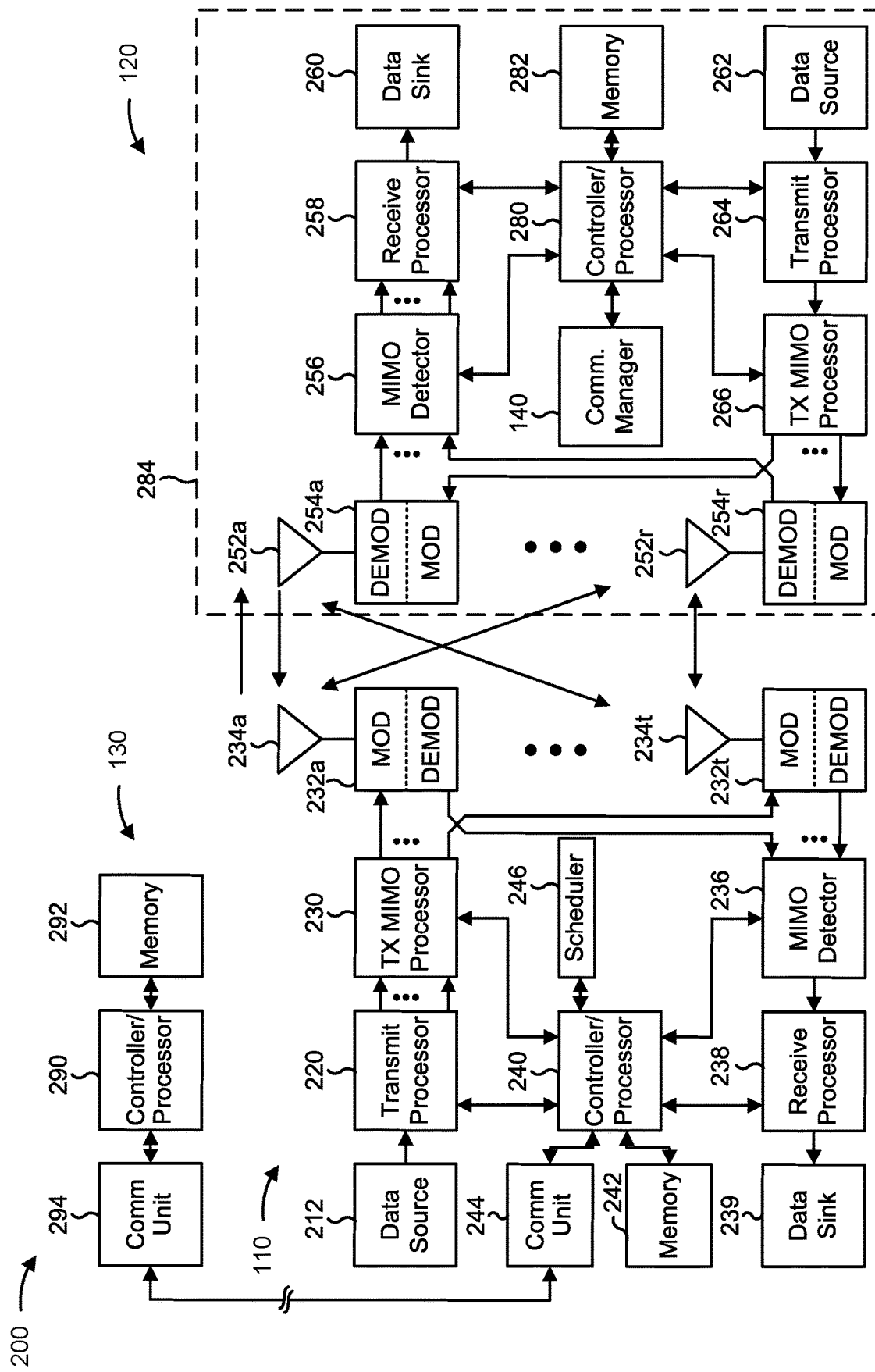
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with power control for SRI based antenna selection, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a configuration for an SRS resource set that includes a first SRS resource associated with a first SRI and a first antenna of the UE, and a second SRS resource associated with a second SRI and a second antenna of the UE; means for receiving first DCI that schedules a first uplink communication on a first uplink channel, wherein the first DCI indicates the first SRI; and/or means for transmitting, using the first antenna, the first uplink communication using a transmit power that is based at least in part on a weighted average of a first pathloss associated with the first antenna and a second pathloss associated with the second antenna. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
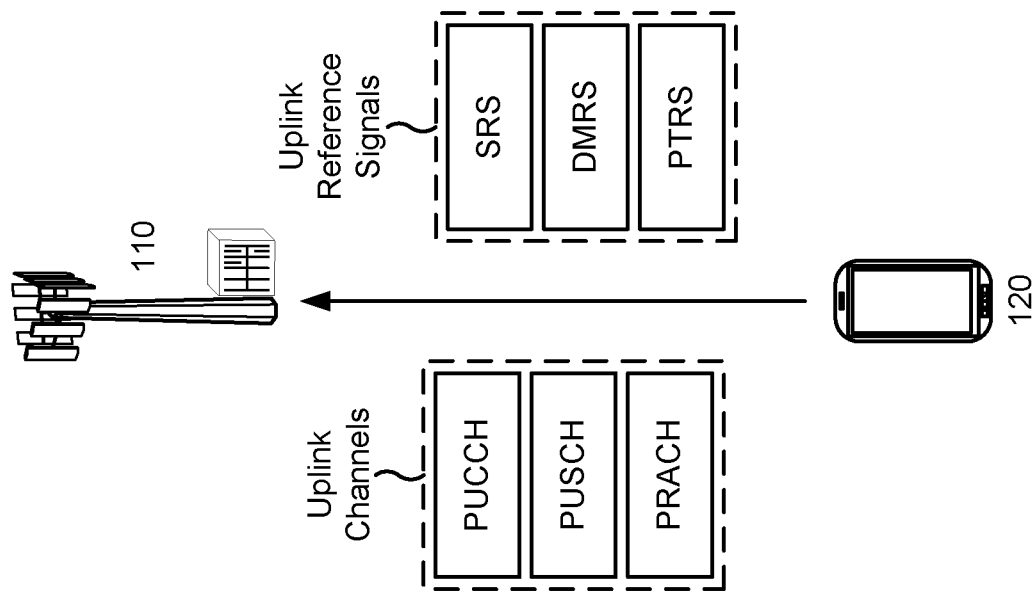
FIG. 3 is a diagram illustrating an example of physical channels and reference signals in a wireless network, in accordance with the present disclosure.
Figure 3:
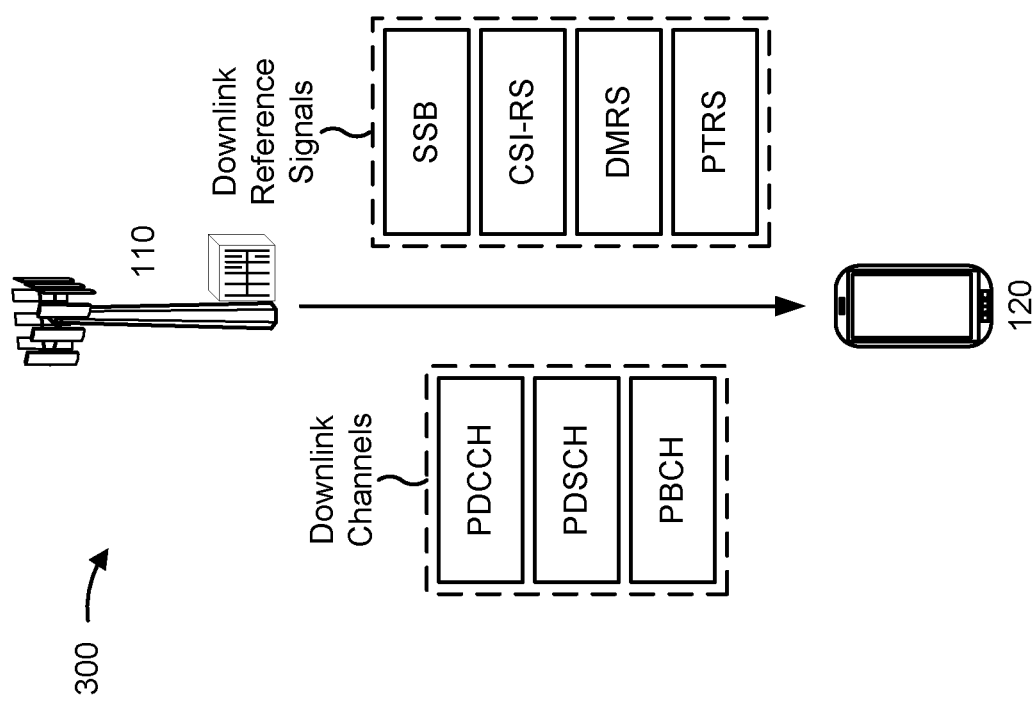

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH. In some examples, the base station 110 and the UE 120 may communicate using a PRACH. The PRACH may be used by the UE 120 to request an uplink allocation from the base station 110. In some examples, the PRACH may be used by the station 110 and the UE 120 to perform a random access procedure, such as a two-step random access procedure or a four-step random access procedure, among other examples. For example, the PRACH may be used to carry random access channel (RACH) transport channel data.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some examples, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a quantity of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be con-fined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some examples, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120. The base station 110 may indicate an SRS resource or an SRS resource set to be used by the UE 120 for an SRS transmission by including an SRI in DCI that schedules the SRS transmission. For example, the SRI may indicate (e.g., may be mapped to) an SRS resource and/or an SRS resource set.

As indicated above, FIG. 3 is provided as an example. Other examples may differ from what is described with regard to FIG. 3.

Figure 4:
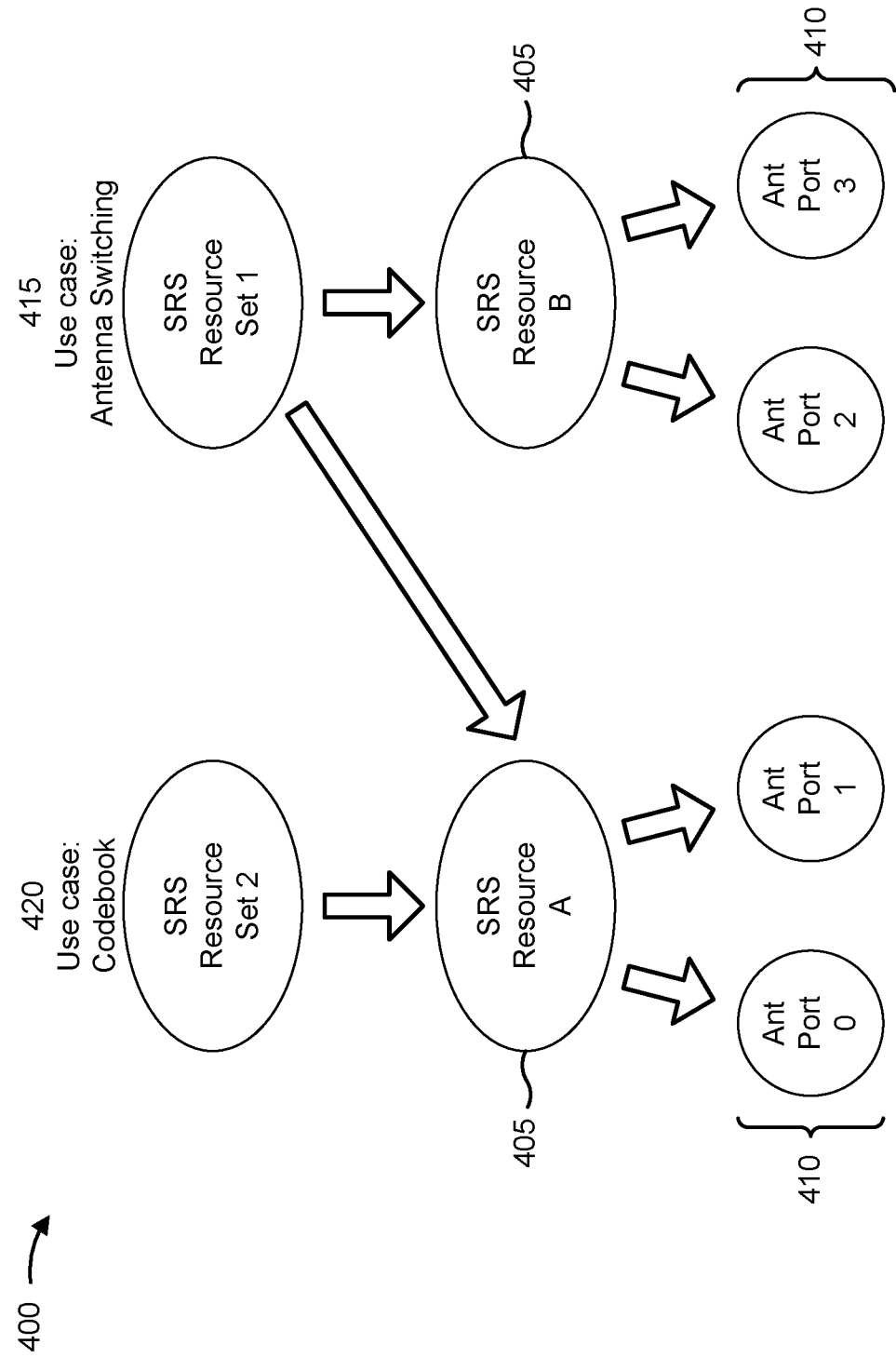
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources). For example, in some cases, an SRS resource set may include up to 16 SRS resources.

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some examples, the configuration for an SRS resource set may indicate a use case (e.g., in an SRS-SetUse information element) for the SRS resource set. For example, an SRS resource set may have a use case of antenna switching, codebook, non-codebook, or beam management. The "use case" of an SRS resource set may also be referred to as a "usage" of the SRS resource set. In some examples, a configured SRS resource set and/or a configured SRS resource may be indicated (e.g., by the base station 110) via an SRI. For example, DCI scheduling a transmission of an SRS using a configured SRS resource may include an SRI (e.g., in an SRI field of the DCI) to indicate the SRS resource and/or the SRS resource set to be used by the UE 120 to transmit the SRS. In some examples, an SRI may be used to indicate a beam and/or precoder of a scheduled uplink transmission. For example, DCI, that scheduled the uplink transmission, may indicate an SRI corresponding to, or mapped to, an SRS resource. The UE may use an antenna port (e.g., an antenna), a beam, and/or a precoder associated with the SRS resource for the uplink transmission.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some examples, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some examples, the UE 120 may be configured with a mapping between SRS ports (e.g., antenna ports) and corresponding SRS resources. The UE 120 may transmit an SRS on a particular SRS resource using an SRS port indicated in the configuration. In some examples, an SRS resource may span N adjacent symbols within a slot (e.g., where N equals 1, 2, or 4). The UE 120 may be configured with X SRS ports (e.g., where X≤4). In some examples, each of the X SRS ports may mapped to a corresponding symbol of the SRS resource and used for transmission of an SRS in that symbol.

As shown in FIG. 4, in some examples, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 4 is provided as an example. Other examples may differ from what is described with regard to FIG. 4.

Figure 5:
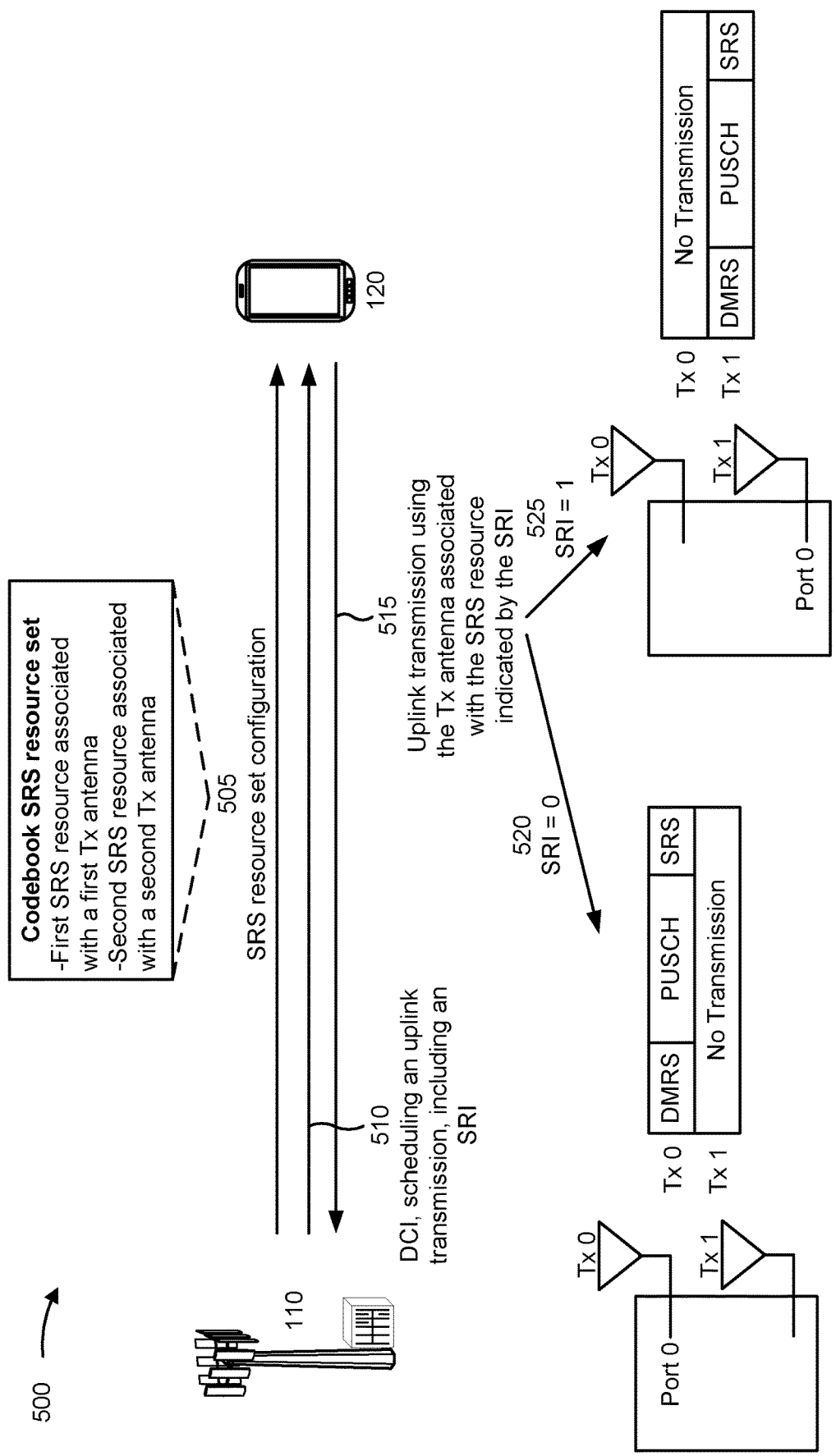
FIG. 5 is a diagram illustrating an example of SRS resource indicator (SRI) based antenna selection, in accordance with the present disclosure.

FIG. 5 is a diagram illustrating an example 500 of SRI based antenna selection, in accordance with the present disclosure. As shown in FIG. 5, a base station 110 and a UE 120 may communicate (e.g., in a wireless network, such as the wireless network 100). Example 500 is associated with UE antenna selection by the base station 110. For example, the UE 120 may not be configured with uplink MIMO. Therefore, the UE 120 may use only a single antenna for uplink transmission (e.g., at a time). In some examples, as shown in FIG. 5, the UE 120 may have multiple antennas (e.g., a first antenna, shown as "Tx 0," and a second antenna shown as "Tx 1"). However, because the UE 120 may be capable of transmitting uplink transmissions using only a single antenna at a time, only one of the antennas of the UE 120 may be available for uplink transmissions (e.g., in a single-input-single-output (SISO) manner). To improve antenna diversity and/or channel diversity, multiple antennas may be made available for use by the UE 120 for uplink transmissions (e.g., even when the UE 120 is not configured with, or capable of, performing uplink MIMO). Enabling multiple antennas to be available for uplink transmissions may improve the performance, quality, and/or reliability of uplink transmissions (e.g., by enabling an antenna, among multiple antennas, associated with the best channel performance to be used for the uplink transmissions).

In some examples, the base station 110 may be enabled to select one or more antennas, of the UE 120, to be used for an uplink transmission using an SRI. For example, as shown by reference number 505, the base station 110 may transmit, and the UE 120 may receive, an SRS resource set configuration. The SRS resource set configuration may be an RRC configuration (e.g., an SRS-Config RRC configuration and/or an SRS-ResourceSet RRC configuration). The SRS resource set configuration may configure an SRS resource set. The SRS resource set may be a codebook SRS resource book (e.g., may be associated with a codebook usage). As shown in FIG. 5, the codebook SRS resource set may include two SRS resources, a first SRS resource and a second SRS resource. In some examples, the quantity of SRS resources included in the codebook SRS resource set may correspond to the quantity of antennas, of the UE 120, available for uplink transmissions. Each SRS resource included in the codebook SRS resource set may be associated with a single port (e.g., a single SRS port). Each SRS resource included in the codebook SRS resource set may be associated with different transmit antennas of the UE 120. For example, the first SRS resource may be associated with a first one or more antennas of the UE 120 (e.g., the Tx 0 antenna) and the second SRS resource may be associated with a second one or more antennas of the UE 120 (e.g., the Tx 1 antenna). The first SRS resource may be associated with, or mapped to, a first SRI value (e.g., a first SRI codepoint, such as "0"). The second SRS resource may be associated with, or mapped to, a second SRI value (e.g., a second SRI codepoint, such as "1").

The base station 110 may use an SRI field in DCI, that schedules an uplink transmission, to select one or more antennas of the UE 120 that are to be used to transmit the uplink transmission. For example, as shown by reference number 510, the base station 110 may transmit, and the UE 120 may receive, DCI that schedules an uplink transmission. The uplink transmission may be an SRS transmission, a PUSCH transmission, a PUCCH transmission, and/or a PRACH transmission, among other examples. The DCI may be a DCI format 0_1 or another DCI format associated with scheduling uplink transmissions (e.g., as defined, or otherwise fixed, by a wireless communication standard, such as the 3GPP). The DCI format may include an SRI field. The base station 110 may include an SRI value, or codepoint, in the SRI field to indicate an SRS resource (e.g., the first SRS resource or the second SRS resource). For example, the base station 110 may include a value of "0" in the SRI field to indicate the first SRS resource or a value of "1" in the SRI field to indicate the second SRS resource. For example, if the base station 110 determines that the UE 120 is to use the first antenna (e.g., the Tx 0 antenna) for the uplink transmission, then the base station 110 may use the SRI field to indicate the first SRS resource (e.g., that is associated with the first antenna). Alternatively, if the base station 110 determines that the UE 120 is to use the second antenna (e.g., the Tx 1 antenna) for the uplink transmission, then the base station 110 may use the SRI field to indicate the second SRS resource (e.g., that is associated with the second antenna).

As shown by reference number 515, the UE 120 may transmit, and the base station 110 may receive, the uplink transmission. The UE 120 may transmit the uplink transmission using an antenna indicated by the SRI value or codepoint included in the DCI. For example, as shown by reference number 520, if the SRI field of the DCI includes a value of "0," then the UE 120 may use the first one or more antennas (e.g., the Tx 0 antenna) to transmit the uplink transmission. Alternatively, as shown by reference number 525, if the SRI field of the DCI includes a value of "1," then the UE 120 may use the second one or more antennas (e.g., the Tx 1 antenna) to transmit the uplink transmission. As shown in FIG. 5, the first antenna and the second antenna may be associated with the same transmit chain. For example, the first antenna and the second antenna may be associated with one or more common RF front end components, such as a power amplifier. As shown in FIG. 5, the uplink transmission using the first antenna or the second antenna may be the same regardless of which antenna is used to transmit the uplink transmission. For example, as shown in FIG. 5, the uplink transmission may include a DMRS, a PUSCH layer, and an SRS. The DMRS, PUSCH layer, and/or the SRS may be the same (e.g., may use the same ports or layers) regardless of which antenna is used to transmit the uplink transmission.

The UE 120 may determine a transmit power for the uplink transmission using open-loop power control (OLPC) and/or closed-loop power control. OLPC is a technique used by a UE to control transmission power of the UE. In OLPC, the UE 120 may perform power control without feedback from the base station 110. For example, the UE 120 may receive a reference signal, estimate a signal strength of the reference signal, and adjust a transmit power of the UE 120 based at least in part on the signal strength and a configuration of the UE 120. OLPC can be contrasted with closed-loop power control, in which the UE 120 adjusts transmit power in accordance with a command received from the base station 110 indicating to increase or decrease the transmit power. For example, in OLPC, the UE 120 may adjust, or determine, the transmit power based at least in part on a measured pathloss (e.g., for the channel to be used to transmit the uplink transmission). Pathloss is a measure of an amount of energy of a signal that is lost between a transmitter and a receiver (e.g., while the signal propagates through the communication channel). Pathloss may also be referred to as path attenuation.

The UE 120 may determine a transmit power for an uplink transmission based at least in part on the channel (e.g., PUSCH, PUCCH, or PRACH) to be used for the uplink transmission. For example, different formulas to determine the transmit power may be defined, or otherwise fixed, for different uplink channels or different uplink transmission types (e.g., by a wireless communication standard, such as the 3GPP). However, for most (or all) channels or uplink transmission types, the transmit power may be based at least in part on a pathloss value. In some cases, the transmit power may further be based at least in part on a target received power level (e.g., a P0 parameter), a pathloss scaling factor parameter (e.g., an alpha or a parameter), and/or a transmit power control (TPC) loop (e.g., one or more closed-loop power control parameters or commands), among other examples.

The UE 120 may estimate pathloss on a per-antenna basis using downlink signals on each of the available transmit antenna ports of the UE 120. In other words, the UE 120 may estimate pathloss using each antenna available for uplink transmissions (e.g., by measuring a configured reference signal, using an antenna, and estimating the pathloss associated with the antenna based at least in part on the measurement of the reference signal). When the network (e.g., the base station 110) schedules an uplink transmission that is to use a given antenna of the UE 120, the UE 120 may determine the transmit power for the uplink transmission using the pathloss that was estimated using the given antenna. However, as described above, in some cases, multiple antennas may be available for selection by the base station 110 for a given uplink channel. For example, by using SRIs as described above, the base station 110 may dynamically select and/or switch an antenna used by the UE 120 for uplink transmissions. Wireless communication standards do not specify a pathloss (e.g., measured from which antenna of the UE 120) to be used for transmit power determinations when the base station 110 is enabled to dynamically select an antenna of the UE 120 that is to be used to transmit uplink transmissions (e.g., as described above). Because pathloss values estimated using different antennas may be different (e.g., the antennas may not be associated with the same pathloss values), using different pathloss values (e.g., associated with different antennas) may result in different transmit powers at the UE 120.

Additionally, using the pathloss associated with the antenna of the UE 120 that is to be used for a next uplink transmission may result in shifts in transmit power at the UE 120, thereby causing transient effects. For example, rapid changes in power draw can cause transient effects that lead to inaccuracy in provided power. "Transients" may refer to sudden but significant deviations from normal power levels. Transients may introduce power deviations, phase deviations, and/or may introduce noise into a channel, among other examples, thereby increasing a decoding complexity or difficulty at the base station 110. For example, because different antennas may be associated with different estimated pathloss values, a first transmit power that is based at least in part on a first pathloss value associated with a first antenna may be different than a second transmit power that is based at least in part on a second pathloss value associated with a second antenna. Because the base station 110 may dynamically switch and/or select an antenna of the UE 120 for uplink transmission (e.g., using SRIs as described above), two uplink transmissions, to be transmitted using different antennas, may be scheduled with a small, or no, time gap between the two uplink transmissions. As a result, the sudden shift in transmit power used by the UE 120 (e.g., between a first uplink transmission using a first antenna and a second uplink transmission using a second antenna) may introduce transient effects into the uplink channel. Further, using a pathloss value that is associated with one antenna for all uplink transmissions (e.g., using a pathloss value that is estimated using a primary antenna for all uplink transmissions) may result in poor pathloss compensation for uplink transmissions that use an antenna other than the primary antenna, thereby decreasing a reliability of the uplink transmissions.

Some techniques and apparatuses described herein enable power control for SRI based antenna selection. For example, when an antenna of a UE 120 for an uplink transmission may be selected, by a base station 110 (or other network node), via an SRI indicated in DCI scheduling the uplink transmission, the UE 120 may use a transmit power that is based at least in part on a weighted average of pathloss values associated with the available antennas for the uplink transmission. As used herein, "weighted average" may refer to an average of a set of values that is calculated by applying weights to each value included in the set of values. For example, if a first antenna and a second antenna may be used, by the UE 120, for uplink transmissions, then the UE 120 may determine a transmit power for an uplink transmission using a weighted average of a first pathloss value (e.g., that is associated with the first antenna) and a second pathloss value (e.g., that is associated with the second antenna) (e.g., regardless of which antenna is actually used for the uplink transmission).

As a result, a pathloss value to be used for transmit power determinations in SRI based antenna selection scenarios may be defined. Moreover, using the weighted average of the pathloss values among available antennas for the uplink transmission may reduce rapid shifts or changes in transmit power at the UE 120, thereby reducing transient effects that would have otherwise been introduced due to rapid shifts or changes in transmit power at the UE 120. Additionally, using the same pathloss value (e.g., regardless of which antenna is actually used for the uplink transmission) may enable the base station 110 to fairly evaluate channels associated with different antennas of the UE 120. For example, if the UE 120 were to use different pathloss values when determining transmit powers for different antennas, the transmit power used by the UE 120 may be different for different antennas (e.g., to compensate for the different pathloss values). As a result, the received power at the base station 110 may not provide an accurate comparison of the channels because the UE 120 used different transmit power levels. However, by using the weighted average of the pathloss values among available antennas for the uplink transmission, the base station 110 may be enabled to make a more accurate comparison of channels associated with different antennas of the UE 120, thereby enabling the base station 110 to make improved UE-antenna selections.

In some aspects, the UE 120 may delay switching an antenna of the UE 120 (e.g., based at least in part on a change in SRI indicated by the base station) until a gap in uplink transmissions. For example, the base station 110 may transmit a DCI that indicates an SRI that is different than another SRI indicated by a most recent DCI received by the UE 120. However, when the UE 120 receives the DCI, there may be consecutive or back-to-back uplink transmissions (e.g., with no time gap or a time gap that does not satisfy a threshold). Therefore, the UE 120 may delay switching the transmit antenna of the UE 120 (e.g., to the antenna indicated the by SRI) until there is a gap in uplink transmissions. For example, the UE 120 may refrain from switching the transmit antenna of the UE 120 until a downlink symbol, downlink slot, and/or gap symbol (e.g., a symbol that is not associated with any transmissions), among other examples. As a result, transient effects caused by switching the antenna of the UE 120 may be reduced. For example, if the UE 120 were to switch the antenna when (or shortly after) the DCI is received, transient effects may be introduced to the consecutive or back-to-back uplink transmissions due to the sudden change in transmit power used by the UE 120. By refraining from, or delaying, switching the antenna of the UE 120, until there is a gap in uplink transmissions, the UE 120 may reduce, or eliminate, the transient effects caused by switching the antenna of the UE 120.

As indicated above, FIG. 5 is provided as an example. Other examples may differ from what is described with regard to FIG. 5.

Figure 6:
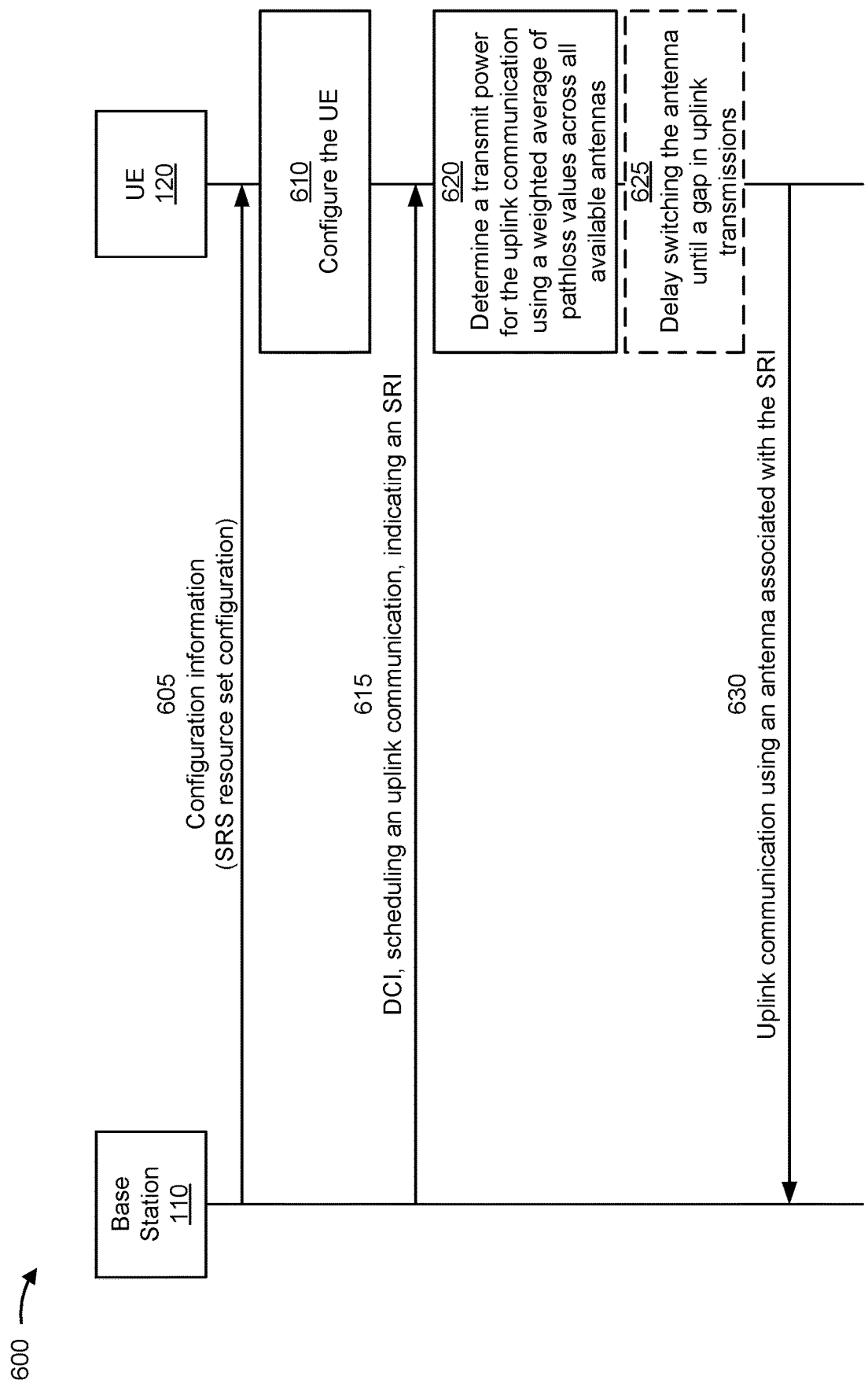
FIG. 6 is a diagram illustrating an example associated with power control for SRI based antenna selection, in accordance with the present disclosure.

FIG. 6 is a diagram illustrating an example 600 associated with power control for SRI based antenna selection, in accordance with the present disclosure. As shown in FIG. 6, a base station 110 and a UE 120 may communicate with one another in a wireless network, such as the wireless network 100. The UE 120 and/or the base station 110 may perform one or more operations associated with power control and/or transient handling for SRI based antenna selection, as described in more detail elsewhere herein. Some examples described herein reference the UE 120 including two antennas (e.g., a first antenna and a second antenna). However, in other examples, the UE 120 may include a different quantity of antennas (e.g., four antennas, eight antennas, or another quantity of antennas). The operation described herein may be similarly applied to all antennas that are available to the UE 120 for uplink transmissions.

As shown by reference number 605, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC signaling (e.g., MAC-CEs). In some aspects, the configuration information may include an indication of one or more configuration parameters (e.g., stored by the UE 120) for selection by the UE 120 and/or explicit configuration information for the UE 120 to use to configure itself.

In some aspects, the configuration information may include an SRS resource set configuration. For example, the base station 110 may transmit, and the UE 120 may receive, a configuration for an SRS resource set that includes a first SRS resource associated with a first SRI and a first antenna of the UE 120, and a second SRS resource associated with a second SRI and a second antenna of the UE 120. The SRS resource set configuration may be an RRC configuration (e.g., an SRS-Config RRC configuration and/or an SRS-ResourceSet RRC configuration). The SRS resource set configuration may configure the SRS resource set. The SRS resource set may be a codebook SRS resource book (e.g., may be associated with a codebook usage). The codebook SRS resource set may include two SRS resources, the first SRS resource and the second SRS resource. In some aspects, the quantity of SRS resources included in the codebook SRS resource set may correspond to the quantity of antennas, of the UE 120, available for uplink transmissions (e.g., if the UE 120 has 2 antennas, then the SRS resource set may include 2 SRS resources; if the UE 120 has 4 antennas, then the SRS resource set may include 4 SRS resources; and so on). Each SRS resource included in the codebook SRS resource set may be associated with a single port (e.g., a single SRS port or a single antenna port). Each SRS resource included in the codebook SRS resource set may be associated with different transmit antennas of the UE 120. For example, the first SRS resource may be associated with the first antenna of the UE 120 and the second SRS resource may be associated with the second antenna of the UE 120 (e.g., in a similar manner as a 1T2R SRS antenna switching configuration, where the UE 120 includes 1 transmit antenna and 2 receive antennas). The first antenna and the second antenna may be transmit antennas of the UE 120 (e.g., the UE 120 may be enabled to transmit uplink transmissions using the first antenna and the second antenna). The first SRS resource may be associated with, or mapped to, a first SRI value (e.g., a first SRI codepoint, such as "0"). The second SRS resource may be associated with, or mapped to, a second SRI value (e.g., a second SRI codepoint, such as "1"). For example, the first SRI value and the second SRI value may be used by the base station 110 to select the first antenna or the second antenna, respectively, for uplink transmissions by the UE 120.

As shown by reference number 610, the UE 120 may configure the UE 120 for communicating with the base station 110. In some aspects, the UE 120 may configure itself based at least in part on the configuration information. For example, the UE 120 may configure itself based at least in part on the SRS resource set configuration (e.g., the codebook SRS resource set configuration). In some aspects, the UE 120 may be configured to perform one or more operations described herein.

As shown by reference number 615, the base station 110 may transmit, and the UE 120 may receive, DCI (e.g., a first DCI message). The DCI may schedule a first uplink communication on a first uplink channel. The first uplink channel may be an SRS channel (e.g., a channel used for an SRS transmission), the PUSCH, the PUCCH, or the PRACH, among other examples. The DCI may indicate an SRI (e.g., an SRI value or codepoint). For example, the DCI may be a format associated with scheduling uplink transmissions that includes an SRI field, such as DCI format 0_1 or another DCI format. The SRI indicated by the DCI may be associated with, or mapped to, an antenna of the UE 120, such as the first antenna or the second antenna.

For example, the base station 110 may select an antenna, from the first antenna or the second antenna, that is to be used by the UE 120 to transmit the first uplink communication. For example, the base station 110 may select the antenna based at least in part on uplink channel conditions associated with the first antenna and/or the second antenna. The base station 110 may include an SRI value or codepoint, associated with the selected antenna, in the DCI. For example, if the base station 110 selects the first antenna, then the base station 110 may include the first SRI in the DCI. As another example, if the base station 110 selects the second antenna, then the base station 110 may include the second SRI in the DCI. In other words, the SRI included in the DCI may indicate, to the UE 120, which antenna of the UE 120 is to be used for the uplink communication scheduled by the DCI (e.g., the first uplink communication).

As shown by reference number 620, the UE 120 may determine a transmit power for the first uplink communication using a weighted average of pathloss values across all available transmit antennas of the UE 120. In other words, the UE 120 may estimate or measure pathloss using each available transmit antenna of the UE 120. The UE 120 may determine a weighted average of the pathloss values. For example, if the UE 120 has 2 available transmit antennas, the weighted average may be based at least in part on an average of a first pathloss $PL_1$ (e.g., measured or estimated using the first antenna) multiplied by a first weight, $W_1$, and a second pathloss $PL_2$ (e.g., measured or estimated using the second antenna) multiplied by a second weight, $W_2$. In other words, the weighted average may be $$\frac{(W_1 \times PL_1) + (W_2 \times PL_2) + \ldots + (W_n \times PL_n)}{n},$$

where n is the quantity of antennas. The first weight may be a value that is greater than or equal to 0 and less than or equal to 1. Similarly, the second weight may be a value that is greater than or equal to 0 and less than or equal to 1. In some aspects, the first weight and the second weight may be greater than 0 and less than 1 (e.g., in some aspects, the first weight and the second weight may not be a value of 0 or 1). In some aspects, a sum of the first weight and the second weight may be 1. For example, a sum of the weights across all antennas of the UE 120 may be equal to 1 (e.g., $W_1 + W_2 + \ldots + W_n = 1$). In some other aspects, the sum of the first weight and the second weight may a value other than 1. In some aspects, the UE 120 may determine the values for the first weight and the second weight. In some other aspects, the base station 110 may indicate or configure the values for the first weight and the second weight.

For example, if the first uplink communication is an SRS transmission, then typically (e.g., for an SRS channel) the transmit power may be determined based at least in part on the equation: $P_0 + \alpha PL + TPC$, where $P_0$ is the target received power level, $\alpha$ is the pathloss scaling factor parameter, PL is the pathloss value measured using the antenna that is to be used to transmit the SRS, and TPC is a transmit power control loop (e.g., a closed-loop power control parameter). In some aspects, rather than PL being the pathloss value measured using the antenna that is to be used to transmit the SRS, PL may be the weighted average pathloss described above. Using the weighted average pathloss for SRS transmissions may enable the base station 110 to gain a more accurate (e.g., fair) comparison of the uplink channels associated with different antennas of the UE 120. For example, because the UE 120 will use the same pathloss value (e.g., the weighted average) in determining their transmit power for all SRS transmissions (e.g., regardless of the antenna used to transmit the SRS transmission), the base station 110 may gain a clearer comparison of the signal quality and/or signal strength when the UE 120 sounds the uplink channel by transmitting an SRS using different antennas (e.g., because the UE 120 will not compensate for the pathloss of the channel associated with the different antennas). In other words, using the equation described above where PL is the pathloss value measured using the antenna that is to be used to transmit the SRS, the received power of the SRS at the base station 110 may be approximately the same (e.g., regardless of the antenna used to transmit the SRS) based at least in part on the UE 120 applying different transmit powers that are based at least in part on the different PL values. On the other hand, by the UE 120 using the weighted average pathloss when determining transmit power (e.g., SRS transmit power) for all antennas, the base station 110 may be enabled to determine which antenna (e.g., which antenna port of the UE 120) is associated with a stronger received signal power at the base station 110 (e.g., to enable the base station to select the antenna associated with the strongest signal for future uplink transmissions).

If the first uplink communication is a PUSCH communication, then the transmit power may be determined based at least in part on the equation: $P_0 + \alpha PL + TPC$. In some aspects for PUSCH communications, such as where SRI-PUSCH-PowerControl is configured, a value of $\alpha$, $P_0$, and the pathloss reference signal (e.g., that is measured to estimate the pathloss) may be based at least in part on the SRI associated with the PUSCH communication (e.g., the SRI indicated by the DCI scheduling the PUSCH communication). In a similar manner as described above, the PL for PUSCH communications may be the weighted average pathloss described above. In other words, the power control determinations for PUSCH communications may use the weighted average pathloss for all PUSCH communications (e.g., regardless of the antenna or antenna port that is actually used to transmit a given PUSCH communication). This may result in a change or jump in received power at the base station 110 from one PUSCH communication to another PUSCH communication (e.g., which may result in some transient effects with a single TPC loop). In some aspects, the UE 120 may perform one or more operations to mitigate the transient effects (e.g., as described in more detail elsewhere herein, such as in connection with reference number 625 and FIG. 7).

If the first uplink communication is a PUCCH communication, then the transmit power may be determined based at least in part on the equation: $P_0 + \alpha PL + TPC$. In some aspects for PUCCH communications, it may be assumed that only a single transmit antenna is available for the UE 120. Therefore, when SRI-based antenna selection is configured for the UE 120, it may be unclear how the UE 120 is to determine pathloss for PUCCH transmit power determinations. In a similar manner as described above, the PL for PUCCH communications may be the weighted average pathloss described above. In other words, the power control determinations for PUCCH communications may use the weighted average pathloss for all PUCCH communications (e.g., regardless of the antenna or antenna port that is actually used to transmit a given PUCCH communication). This may result in a change or jump in received power at the base station 110 from one PUCCH communication to another PUCCH communication (e.g., which may result in some transient effects with a single TPC loop). In some aspects, the UE 120 may perform one or more operations to mitigate the transient effects (e.g., as described in more detail elsewhere herein, such as in connection with reference number 625 and FIG. 7).

If the first uplink communication is a PRACH communication, then the transmit power may be determined based at least in part on the equation: $P_{Target} + PL$, where $P_{Target}$ is a target received transmit power. Similar to PUCCH communications, transmit power determinations for PRACH communications may assume that only a single transmit antenna is available for the UE 120. Therefore, when SRI-based antenna selection is configured for the UE 120, how the UE 120 is to determine pathloss for PRACH transmit power determinations may be unclear. In a similar manner as described above, the PL for PRACH communications may be the weighted average pathloss described above. In other words, the power control determinations for PRACH communications may use the weighted average pathloss for all PRACH communications (e.g., regardless of the antenna or antenna port that is actually used to transmit a given PRACH communication).

Using the weighted average pathloss for power control determinations of uplink transmissions may ensure that the base station 110 is enabled to gain an accurate comparison of signals transmitted by different antennas of the UE 120. For example, using the weighted average pathloss for all uplink transmissions (e.g., in an SRI based antenna selection scenario) may ensure that the UE 120 does not increase a transmit power for certain antennas (e.g., due to a different pathloss value associated with those antennas), thereby causing the base station 110 to view the antennas as being associated with better channel parameters than other antennas (e.g., that are transmitted with a lower transmit power). Therefore, the weighted average pathloss for power control determinations of uplink transmissions may improve UE-antenna selections made by the base station 110.

In some aspects, as shown by reference number 625, the UE 120 may delay switching from a first antenna to a second antenna (e.g., based at least in part on a change in SRI indicated by the base station 110) until a gap in uplink transmissions (e.g., until a gap in uplink slots or symbols). For example, prior to receiving the DCI as described above in connection with reference number 615, the UE 120 may have received a second DCI that schedules a second uplink communication on a second uplink channel (e.g., the second uplink channel may be different than the first uplink channel or the same as the uplink channel). The second DCI may indicate the second SRI (e.g., where the first DCI indicates the first SRI). In other words, the DCI as described above in connection with reference number 615 may indicate that the UE 120 is to switch transmit antennas used by the UE 120. As described in more detail elsewhere herein, switching the transmit antenna of the UE 120 may cause transient effects due to a sudden change in transmit power at the UE and/or a sudden change in received power at the base station 110 (e.g., particularly for consecutive uplink transmissions or uplink transmissions with a time gap, between the uplink transmissions, that does not satisfy a threshold). Therefore, rather than immediately switching the antenna of the UE 120 (e.g., as indicated by the SRI included in DCI), the UE 120 may delay switching the antenna until there is a gap in uplink transmissions (e.g., to mitigate the transient effects caused by switching the transmit antenna).

For example, the UE 120 may identify that a first uplink transmission is to be transmitted using the first antenna and a second uplink transmission is to be transmitted using the second antenna (e.g., as indicated by SRIs included in DCI scheduling the first uplink transmission and the second uplink transmission). The UE 120 may determine whether a time gap between the first uplink transmission and the second uplink transmission satisfies a threshold. If the time gap satisfies the threshold, then the UE 120 may switch the transmit antenna of the UE 120 from the first antenna to the second antenna (e.g., for the second uplink transmission). However, if the time gap does not satisfy the threshold, then the UE 120 may delay switching the transmit antenna of the UE 120 from the first antenna to the second antenna until there is a sufficient gap (e.g., that does satisfy the threshold) between uplink transmissions. For example, the UE 120 may delay switching the transmit antenna of the UE 120 from the first antenna to the second antenna until a next downlink slot, a next downlink symbol, or a next gap symbol, among other examples. The delayed antenna switching by the UE 120 is depicted and described in more detail in connection with FIG. 7.

As shown by reference number 630, the UE 120 may transmit, and the base station 110 may receive, the first uplink communication (e.g., that is scheduled by the DCI received by the UE 120 as described in connection with reference number 615). The UE 120 may transmit the first uplink communication using the antenna of the UE 120 that is associated with the SRI included in the DCI. The UE 120 may transmit the first uplink communication using a transmit power that is based at least in part on the weighted average of a first pathloss associated with the first antenna and a second pathloss associated with the second antenna, as described in more detail elsewhere herein.

As a result, by using the weighted average of the pathloss values among available antennas for the uplink transmission, the base station 110 may be enabled to make a more accurate comparison of channels associated with different antennas of the UE 120, thereby enabling the base station 110 to make improved UE-antenna selections.

As indicated above, FIG. 6 is provided as an example. Other examples may differ from what is described with respect to FIG. 6.

Figure 7:
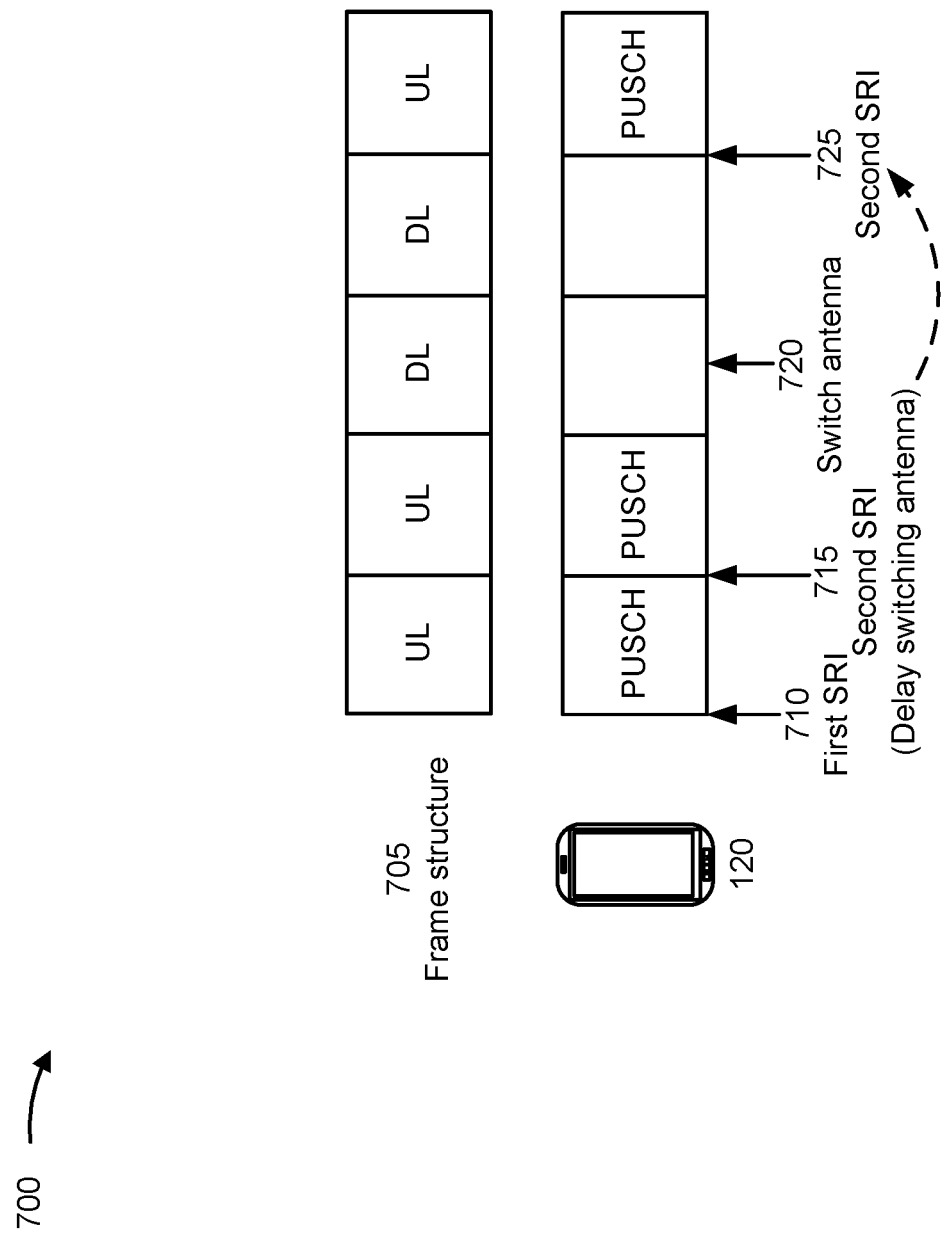
FIG. 7 is a diagram illustrating an example associated with transient handling for SRI based antenna selection, in accordance with the present disclosure.

FIG. 7 is a diagram illustrating an example 700 associated with transient handling for SRI based antenna selection, in accordance with the present disclosure. Example 700 is associated with a UE 120 delaying an antenna switch, that is triggered by SRI included in DCI transmitted by a base station 110, to mitigate transient effects caused by the antenna switch.

As shown in FIG. 7, the UE 120 may be configured with a frame structure 705. For example, the UE 120 may receive a time-division duplexing (TDD) configuration. The TDD resource configuration may indicate one or more frame structures. A frame structure may indicate a quantity of slots or symbols in a communication frame associated with a cell provided by a base station 110 and, for each slot, a configured communication direction. Each slot may be configured as a downlink slot, an uplink slot, or a flexible slot, which may be used for downlink traffic or uplink traffic. As used herein, "downlink slot" may refer to a slot in which downlink traffic is communicated. "Downlink symbol" may refer to a symbol in which downlink traffic is communicated. "Uplink slot" may refer to a slot in which uplink traffic is communicated. "Uplink symbol" may refer to a symbol in which uplink traffic is communicated. In some aspects, the frame structure 705 may include one or more gap symbols. A "gap symbol" may be a symbol in which no traffic is communicated by the UE 120.

As shown by reference number 710, the UE 120 may transmit a first uplink communication (e.g., shown as a PUSCH communication) that is associated with a first SRI. Although FIG. 7 shows PUSCH communications, the uplink communications described herein may be any uplink communications, such as SRS communications, PUCCH communications, and/or PRACH communications, among other examples. A first DCI scheduling the first uplink communication may indicate the first SRI. Because the first DCI indicates the first SRI, the UE 120 may use a first transmit antenna to transmit the first uplink communication. As shown by reference number 715, a second uplink communication may be associated with a second SRI. For example, a second DCI scheduling the first uplink communication may indicate the second SRI. The second SRI may indicate that the UE 120 is to switch transmit antennas from the first antenna to a second antenna (e.g., that is associated with the second SRI).

However, because the first uplink communication and the second uplink communication occur consecutively (e.g., with no time gap between the uplink communications), the UE 120 may delay switching the transmit antenna of the UE 120. For example, the UE 120 may determine that the first uplink communication and the second uplink communication are scheduled consecutively and/or that a time gap between the first uplink communication and the second uplink communication does not satisfy a threshold. Therefore, the UE 120 may determine that the antenna switch indicated by the change in SRI should be delayed by the UE 120 (e.g., based at least in part on the first uplink communication and the second uplink communication being scheduled consecutively and/or on the time gap between the first uplink communication and the second uplink communication not satisfying the threshold). For example, the UE 120 may transmit the second uplink communication using the first antenna that is associated with the first SRI (e.g., even though the second uplink communication is associated with the second SRI).

As shown by reference number 720, the UE 120 may switch the transmit antenna from the first antenna to the second antenna during a gap in uplink transmissions (e.g., a gap in uplink burst transmissions) that occurs an amount of time after the UE receives the second DCI that indicates the second SRI. For example, the gap in uplink transmissions may be associated with a downlink symbol, a downlink slot, or a gap symbol, among other examples. The UE 120 may switch the transmit antenna at any point during the gap in uplink transmissions. For example, the UE 120 may switch the transmit antenna at, or near, the start of the gap. As another example, the UE 120 may switch the transmit antenna at, or near, the end of the gap (e.g., to enable the UE 120 to receive additional DCI that may indicate that the antenna switch is no longer needed, thereby conserving resources that would have otherwise been used to switch the transmit antenna to the second antenna and then back to the first antenna). As another example, the UE 120 may switch the transmit antenna at some point during the middle of the gap. In some aspects, the UE 120 may delay the antenna switch indicated by the SRIs until a gap that is associated with an amount of time that satisfies an antenna switching threshold.

As shown by reference number 725, the UE 120 may transmit a third uplink communication using the second antenna (e.g., that is associated with the second SRI). By delaying the antenna switch from the first antenna to the second antenna until the gap, the UE 120 may mitigate RF transient effects cause by the antenna switch. For example, if the UE 120 were to switch the transmit antenna at the point in time indicated by the arrow of reference number 715, then the antenna switch may cause transient effects that negatively impact both the first uplink communication and the second uplink communication. Delaying the antenna switch indicated by SRIs until the gap in uplink transmissions may improve uplink performance by the UE 120 (e.g., by mitigating any transient effects that may be caused by the antenna switch).

As indicated above, FIG. 7 is provided as an example. Other examples may differ from what is described with respect to FIG. 7.

Figure 8:
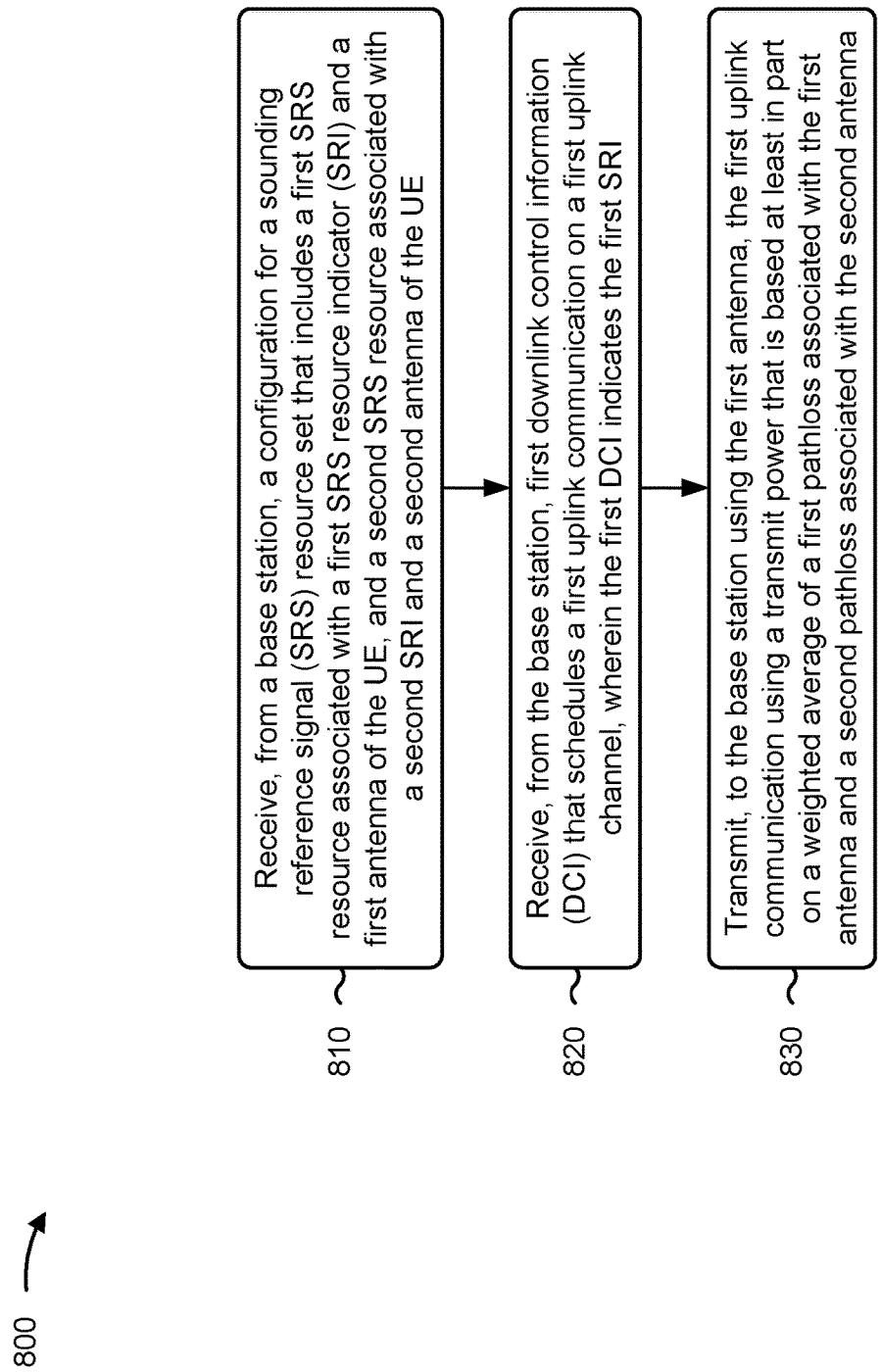
FIG. 8 is a diagram illustrating an example process associated with power control for SRI based antenna selection, in accordance with the present disclosure.

FIG. 8 is a diagram illustrating an example process 800 performed, for example, by a UE, in accordance with the present disclosure. Example process 800 is an example where the UE (e.g., UE 120) performs operations associated with power control for SRI based antenna selection.

As shown in FIG. 8, in some aspects, process 800 may include receiving, from a base station, a configuration for an SRS resource set that includes a first SRS resource associated with a first SRI and a first antenna of the UE, and a second SRS resource associated with a second SRI and a second antenna of the UE (block 810). For example, the UE (e.g., using communication manager 140 and/or reception component 902, depicted in FIG. 9) may receive, from a base station, a configuration for an SRS resource set that includes a first SRS resource associated with a first SRI and a first antenna of the UE, and a second SRS resource associated with a second SRI and a second antenna of the UE, as described above.

As further shown in FIG. 8, in some aspects, process 800 may include receiving, from the base station, first DCI that schedules a first uplink communication on a first uplink channel, wherein the first DCI indicates the first SRI (block 820). For example, the UE (e.g., using communication manager 140 and/or reception component 902, depicted in FIG. 9) may receive, from the base station, first DCI that schedules a first uplink communication on a first uplink channel, wherein the first DCI indicates the first SRI, as described above.

As further shown in FIG. 8, in some aspects, process 800 may include transmitting, to the base station using the first antenna, the first uplink communication using a transmit power that is based at least in part on a weighted average of a first pathloss associated with the first antenna and a second pathloss associated with the second antenna (block 830). For example, the UE (e.g., using communication manager 140 and/or transmission component 904, depicted in FIG. 9) may transmit, to the base station using the first antenna, the first uplink communication using a transmit power that is based at least in part on a weighted average of a first pathloss associated with the first antenna and a second pathloss associated with the second antenna, as described above.

Process 800 may include additional aspects, such as any single aspect or any combination of aspects described below and/or in connection with one or more other processes described elsewhere herein.

In a first aspect, the first SRI and the second SRI are used by the base station to select the first antenna or the second antenna, respectively, for uplink transmissions by the UE.

In a second aspect, alone or in combination with the first aspect, process 800 includes receiving, from the base station, a second DCI that schedules a second uplink communication on a second uplink channel, wherein the second DCI indicates the second SRI, and transmitting, to the base station using the second antenna, the second uplink communication using the transmit power that is based at least in part on the weighted average.

In a third aspect, alone or in combination with one or more of the first and second aspects, the first uplink channel and the second uplink channel are different uplink channels.

In a fourth aspect, alone or in combination with one or more of the first through third aspects, the first uplink channel and the second uplink channel are a same uplink channel.

In a fifth aspect, alone or in combination with one or more of the first through fourth aspects, process 800 includes delaying switching from the first antenna to the second antenna until a gap in uplink transmissions.

In a sixth aspect, alone or in combination with one or more of the first through fifth aspects, a gap in uplink transmissions occurs an amount of time after the UE receives the second DCI that indicates the second SRI, and process 800 includes switching from the first antenna to the second antenna during the gap based at least in part on receiving the second DCI.

In a seventh aspect, alone or in combination with one or more of the first through sixth aspects, the gap is associated with a downlink symbol or a gap symbol.

In an eighth aspect, alone or in combination with one or more of the first through seventh aspects, the weighted average is based at least in part on an average of the first pathloss multiplied by a first weight and the second pathloss multiplied by a second weight.

In a ninth aspect, alone or in combination with one or more of the first through eighth aspects, the first weight and the second weight are greater than or equal to 0 (zero) and less than or equal to 1 (one).

In a tenth aspect, alone or in combination with one or more of the first through ninth aspects, a sum of the first weight and the second weight is 1 (one).

In an eleventh aspect, alone or in combination with one or more of the first through tenth aspects, the first uplink channel is at least one of an SRS channel, a PUSCH, a PUCCH, or a PRACH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
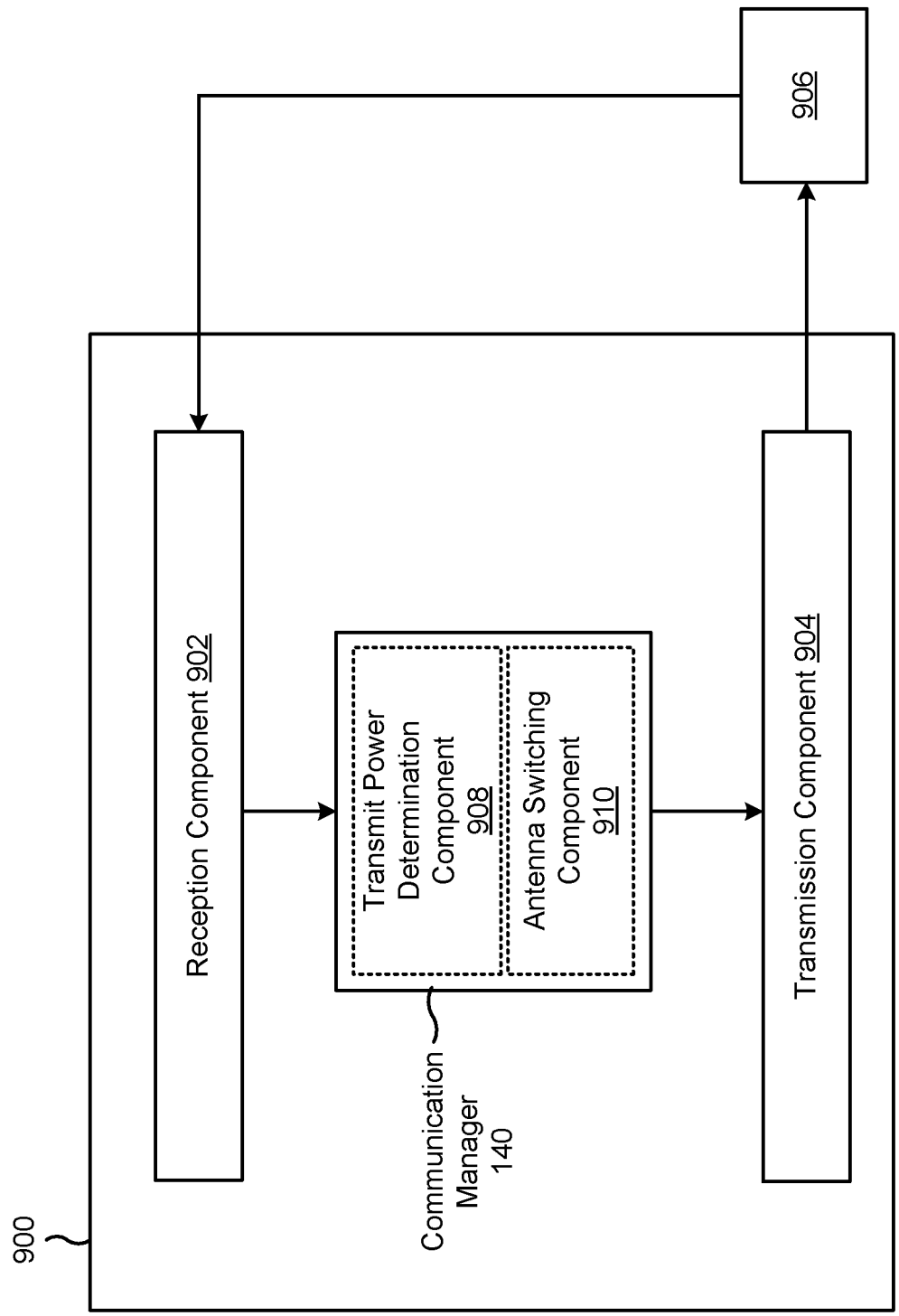
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a transmit power determination component 908, and/or an antenna switching component 910, among other examples.

In some aspects, the apparatus 900 may be configured to perform one or more operations described herein in connection with FIGS. 6 and 7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, a configuration for an SRS resource set that includes a first SRS resource associated with a first SRI and a first antenna of the UE, and a second SRS resource associated with a second SRI and a second antenna of the UE. The reception component 902 may receive, from the base station, first DCI that schedules a first uplink communication on a first uplink channel, wherein the first DCI indicates the first SRI. The transmission component 904 may transmit, to the base station using the first antenna, the first uplink communication using a transmit power that is based at least in part on a weighted average of a first pathloss associated with the first antenna and a second pathloss associated with the second antenna.

The transmit power determination component 908 may determine the transmit power based at least in part on the weighted average of the first pathloss and the second pathloss.

The reception component 902 may receive, from the base station, a second DCI that schedules a second uplink communication on a second uplink channel, wherein the second DCI indicates the second SRI. The transmission component 904 may transmit, to the base station using the second antenna, the second uplink communication using the transmit power that is based at least in part on the weighted average.

The antenna switching component 910 may delay switching from the first antenna to the second antenna until a gap in uplink transmissions. The antenna switching component 910 may switch from the first antenna to the second antenna during a gap in uplink transmissions based at least in part on receiving the second DCI.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 10:
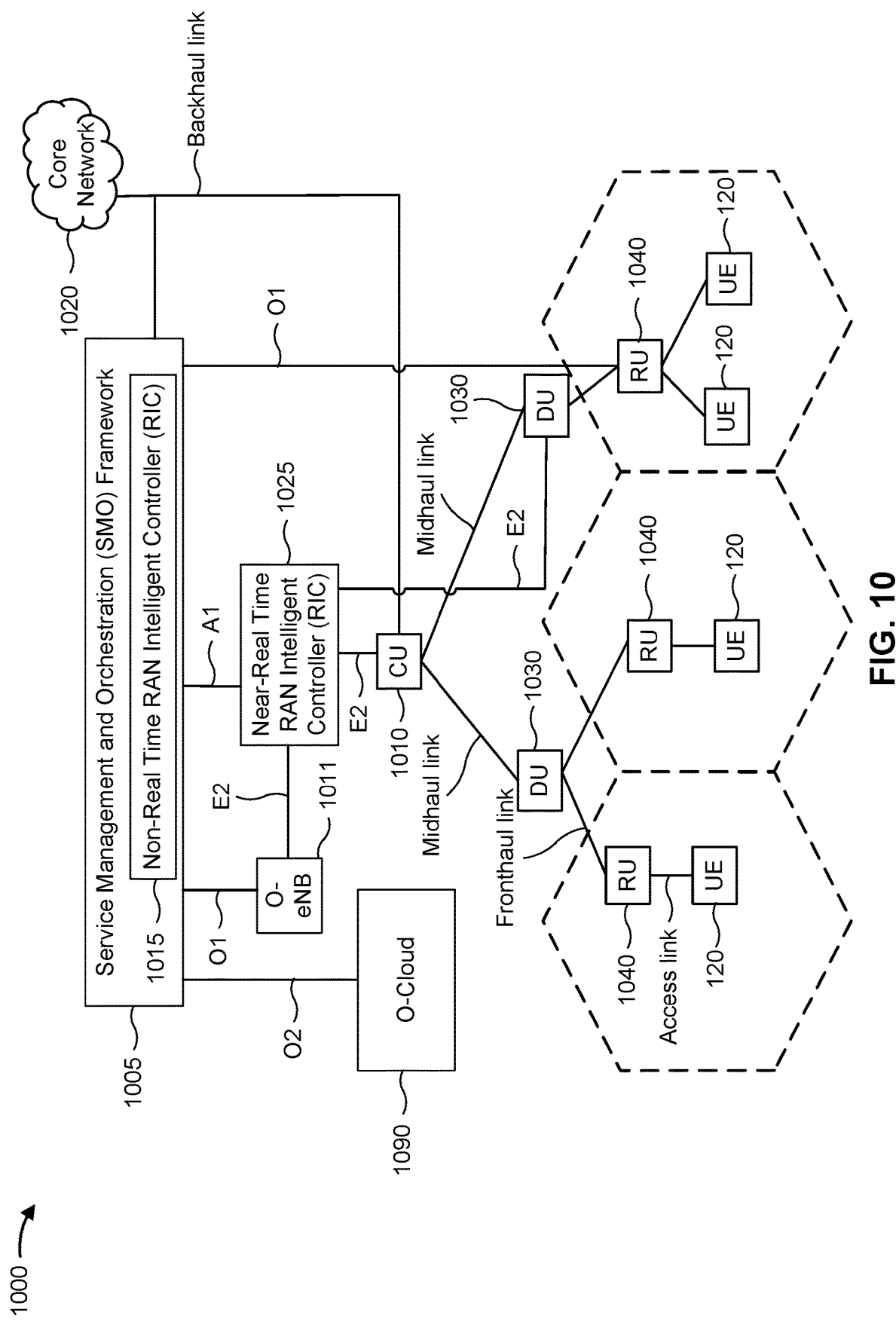
FIG. 10 is a diagram illustrating an example disaggregated base station architecture, in accordance with the present disclosure.

FIG. 10 is a diagram illustrating an example disaggregated base station architecture 1000, in accordance with the present disclosure. The disaggregated base station architecture 1000 may include a CU 1010 that can communicate directly with a core network 1020 via a backhaul link, or indirectly with the core network 1020 through one or more disaggregated control units (such as a Near-RT RAN intelligent control (IC) 1025 via an E2 link, or a Non-RT RIC 1015 associated with a Service Management and Orchestration (SMO) Framework 1005, or both). A CU 1010 may communicate with one or more DUs 1030 via respective midhaul links, such as through F1 interfaces. Each of the DUs 1030 may communicate with one or more RUs 1040 via respective fronthaul links. Each of the RUs 1040 may communicate with one or more UEs 120 via respective radio frequency (RF) access links. In some implementations, a UE 120 may be simultaneously served by multiple RUs 1040.

Each of the units, including the CUs 1010, the DUs 1030, the RUs 1040, as well as the Near-RT RICs 1025, the Non-RT RICs 1015, and the SMO Framework 1005, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 1010. The CU 1010 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1010 can be logically split into one or more CU-UP units and one or more CU-CP units. A CU-UP unit can communicate bidirectionally with a CU-CP unit via an interface, such as the E1 interface when implemented in an O-RAN configuration. The CU 1010 can be implemented to communicate with a DU 1030, as necessary, for network control and signaling.

Each DU 1030 may correspond to a logical unit that includes one or more base station functions to control the operation of one or more RUs 1040. In some aspects, the DU 1030 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1030 may further host one or more low PHY layers, such as implemented by one or more modules for a fast Fourier transform (FFT), an inverse FFT (iFFT), digital beamforming, or PRACH extraction and filtering, among other examples. Each layer (which also may be referred to as a module) can be implemented with an interface configured to communicate signals with other layers (and modules) hosted by the DU 1030, or with the control functions hosted by the CU 1010.

Each RU 1040 may implement lower-layer functionality. In some deployments, an RU 1040, controlled by a DU 1030, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1040 can be operated to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable each DU 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements, which may be managed via an operations and maintenance interface (such as an O1 interface). For virtualized network elements, the SMO Framework 1005 may be configured to interact with a cloud computing platform (such as an open cloud (O-Cloud) platform 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040, non-RT RICs 1015, and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with each of one or more RUs 1040 via a respective O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via an O1 interface) or via creation of RAN management policies (such as A1 interface policies).

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: receiving a configuration for a sounding reference signal (SRS) resource set that includes a first SRS resource associated with a first SRS resource indicator (SRI) and a first antenna of the UE, and a second SRS resource associated with a second SRI and a second antenna of the UE; receiving first downlink control information (DCI) that schedules a first uplink communication on a first uplink channel, wherein the first DCI indicates the first SRI; and transmitting, using the first antenna, the first uplink communication using a transmit power that is based at least in part on a weighted average of a first pathloss associated with the first antenna and a second pathloss associated with the second antenna.

Aspect 2: The method of Aspect 1, wherein the first SRI and the second SRI are associated with selecting the first antenna or the second antenna, respectively, for uplink transmissions by the UE.

Aspect 3: The method of any of Aspects 1-2, further comprising: receiving a second DCI that schedules a second uplink communication on a second uplink channel, wherein the second DCI indicates the second SRI; and transmitting, using the second antenna, the second uplink communication using the transmit power that is based at least in part on the weighted average.

Aspect 4: The method of Aspect 3, wherein the first uplink channel and the second uplink channel are different uplink channels.

Aspect 5: The method of Aspect 3, wherein the first uplink channel and the second uplink channel are a same uplink channel.

Aspect 6: The method of any of Aspects 3-5, further comprising: delaying switching from the first antenna to the second antenna until a gap in uplink transmissions.

Aspect 7: The method of any of Aspects 3-6, wherein a gap in uplink transmissions occurs an amount of time after the UE receives the second DCI that indicates the second SRI, the method further comprising: switching from the first antenna to the second antenna during the gap based at least in part on receiving the second DCI.

Aspect 8: The method of any of Aspects 6-7, wherein the gap is associated with a downlink symbol or a gap symbol.

Aspect 9: The method of any of Aspects 1-8, wherein the weighted average is based at least in part on an average of the first pathloss multiplied by a first weight and the second pathloss multiplied by a second weight.

Aspect 10: The method of Aspect 9, wherein the first weight and the second weight are greater than or equal to 0 and less than or equal to 1.

Aspect 11: The method of any of Aspects 9-10, wherein a sum of the first weight and the second weight is 1.

Aspect 12: The method of any of Aspects 1-11, wherein the first uplink channel is at least one of: an SRS channel, a physical uplink shared channel (PUSCH), a physical uplink control channel (PUCCH), or a physical random access channel (PRACH).

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a processing system that includes one or more processors and one or more code-storing memories coupling with the one or more processors, the processing system configured to cause the UE to:
      receive a configuration for a sounding reference signal (SRS) resource set that includes a first SRS resource associated with a first SRS resource indicator (SRI) and a first antenna of the UE, and a second SRS resource associated with a second SRI and a second antenna of the UE;
      receive first downlink control information (DCI) that schedules a first uplink communication on a first uplink channel, wherein the first DCI indicates the first SRI; and
      transmit, using the first antenna, the first uplink communication using a transmit power that is based at least in part on a weighted average of a first pathloss associated with the first antenna and a second pathloss associated with the second antenna.

2. The UE of claim 1, wherein the first SRI and the second SRI are associated with selecting the first antenna or the second antenna, respectively, for uplink transmissions by the UE.

3. The UE of claim 1, wherein the one or more processors are further configured to:
   receive a second DCI that schedules a second uplink communication on a second uplink channel, wherein the second DCI indicates the second SRI; and
   transmit, using the second antenna, the second uplink communication using the transmit power that is based at least in part on the weighted average.

4. The UE of claim 3, wherein the first uplink channel and the second uplink channel are different uplink channels.

5. The UE of claim 3, wherein the first uplink channel and the second uplink channel are a same uplink channel.

6. The UE of claim 3, wherein the one or more processors are further configured to:
   delay switching from the first antenna to the second antenna until a gap in uplink transmissions.

7. The UE of claim 3, wherein a gap in uplink transmissions occurs an amount of time after the UE receives the second DCI that indicates the second SRI, and wherein the one or more processors are further configured to:
   switch from the first antenna to the second antenna during the gap based at least in part on receiving the second DCI.

8. The UE of claim 7, wherein the gap is associated with a downlink symbol or a gap symbol.

9. The UE of claim 1, wherein the weighted average is based at least in part on an average of the first pathloss multiplied by a first weight and the second pathloss multiplied by a second weight.

10. The UE of claim 9, wherein the first weight and the second weight are greater than or equal to 0 and less than or equal to 1.

11. The UE of claim 9, wherein a sum of the first weight and the second weight is 1.

12. The UE of claim 1, wherein the first uplink channel is at least one of:
   an SRS channel,
   a physical uplink shared channel (PUSCH),
   a physical uplink control channel (PUCCH), or
   a physical random access channel (PRACH).

13. A method of wireless communication performed by a user equipment (UE), comprising:
- receiving a configuration for a sounding reference signal (SRS) resource set that includes a first SRS resource associated with a first SRS resource indicator (SRI) and a first antenna of the UE, and a second SRS resource associated with a second SRI and a second antenna of the UE;
- receiving first downlink control information (DCI) that schedules a first uplink communication on a first uplink channel, wherein the first DCI indicates the first SRI; and
- transmitting, using the first antenna, the first uplink communication using a transmit power that is based at least in part on a weighted average of a first pathloss associated with the first antenna and a second pathloss associated with the second antenna.

14. The method of claim 13, wherein the first SRI and the second SRI are associated with selecting the first antenna or the second antenna, respectively, for uplink transmissions by the UE.

15. The method of claim 13, further comprising:
- receiving a second DCI that schedules a second uplink communication on a second uplink channel, wherein the second DCI indicates the second SRI; and
- transmitting, using the second antenna, the second uplink communication using the transmit power that is based at least in part on the weighted average.

16. The method of claim 15, wherein the first uplink channel and the second uplink channel are different uplink channels.

17. The method of claim 15, wherein the first uplink channel and the second uplink channel are a same uplink channel.

18. The method of claim 15, further comprising:
- delaying switching from the first antenna to the second antenna until a gap in uplink transmissions.

19. The method of claim 15, wherein a gap in uplink transmissions occurs an amount of time after the UE receives the second DCI that indicates the second SRI, the method further comprising:
- switching from the first antenna to the second antenna during the gap based at least in part on receiving the second DCI.

20. The method of claim 19, wherein the gap is associated with a downlink symbol or a gap symbol.

21. The method of claim 13, wherein the weighted average is based at least in part on an average of the first pathloss multiplied by a first weight and the second pathloss multiplied by a second weight.

22. The method of claim 21, wherein the first weight and the second weight are greater than or equal to 0 and less than or equal to 1.

23. The method of claim 21, wherein a sum of the first weight and the second weight is 1.

24. The method of claim 13, wherein the first uplink channel is at least one of:
- an SRS channel,
- a physical uplink shared channel (PUSCH),
- a physical uplink control channel (PUCCH), or
- a physical random access channel (PRACH).

25. A non-transitory computer-readable medium storing a set of instructions for wireless communication, the set of instructions comprising:
- one or more instructions that, when executed by one or more processors of a user equipment (UE), cause the UE to:
  - receive a configuration for a sounding reference signal (SRS) resource set that includes a first SRS resource associated with a first SRS resource indicator (SRI) and a first antenna of the UE, and a second SRS resource associated with a second SRI and a second antenna of the UE;
  - receive first downlink control information (DCI) that schedules a first uplink communication on a first uplink channel, wherein the first DCI indicates the first SRI; and
  - transmit, using the first antenna, the first uplink communication using a transmit power that is based at least in part on a weighted average of a first pathloss associated with the first antenna and a second pathloss associated with the second antenna.

26. The non-transitory computer-readable medium of claim 25, wherein the one or more instructions further cause the UE to:
- receive a second DCI that schedules a second uplink communication on a second uplink channel, wherein the second DCI indicates the second SRI; and
- transmit, using the second antenna, the second uplink communication using the transmit power that is based at least in part on the weighted average.

27. The non-transitory computer-readable medium of claim 25, wherein the one or more instructions further cause the UE to:
- delay switching from the first antenna to the second antenna until a gap in uplink transmissions.

28. An apparatus for wireless communication, comprising:
- means for receiving a configuration for a sounding reference signal (SRS) resource set that includes a first SRS resource associated with a first SRS resource indicator (SRI) and a first antenna of the apparatus, and a second SRS resource associated with a second SRI and a second antenna of the apparatus;
- means for receiving first downlink control information (DCI) that schedules a first uplink communication on a first uplink channel, wherein the first DCI indicates the first SRI; and
- means for transmitting, using the first antenna, the first uplink communication using a transmit power that is based at least in part on a weighted average of a first pathloss associated with the first antenna and a second pathloss associated with the second antenna.

29. The apparatus of claim 28, further comprising:
- means for receiving a second DCI that schedules a second uplink communication on a second uplink channel, wherein the second DCI indicates the second SRI; and
- means for transmitting, using the second antenna, the second uplink communication using the transmit power that is based at least in part on the weighted average.

30. The apparatus of claim 29, further comprising:
- means for delaying switching from the first antenna to the second antenna until a gap in uplink transmissions.

* * * * *